(12) United States Patent
Vos et al.

(10) Patent No.: US 7,160,482 B2
(45) Date of Patent: Jan. 9, 2007

(54) COMPOSITION COMPRISING AN OXIDIZING AND COMPLEXING COMPOUND

(75) Inventors: Rita Vos, Tremelo (BE); Paul Mertens, Bonheiden (BE); Albrecht Fester, Frankfurt am Main (DE); Oliver Doll, Heusenstamm (DE); Bernd Kolbesen, Bad Homburg (DE)

(73) Assignees: IMEC vzw, Leuven (BE); Air Products and Chemicals, Inc., Allentown, PA (US)

( * ) Notice: Subject to any disclaimer, the term of this patent is extended or adjusted under 35 U.S.C. 154(b) by 323 days.

(21) Appl. No.: 10/451,230

(22) PCT Filed: Dec. 21, 2001

(86) PCT No.: PCT/BE01/00219

§ 371 (c)(1),
(2), (4) Date: Apr. 1, 2004

(87) PCT Pub. No.: WO02/051961

PCT Pub. Date: Jul. 4, 2002

(65) Prior Publication Data

US 2005/0009207 A1      Jan. 13, 2005

Related U.S. Application Data

(60) Provisional application No. 60/257,928, filed on Dec. 22, 2000.

(51) Int. Cl.
*C09L 13/00*     (2006.01)
*C09K 13/06*     (2006.01)
*H01L 21/302*    (2006.01)

(52) U.S. Cl. .................. 252/79.1; 252/79.4; 438/745; 438/754

(58) Field of Classification Search ............... 252/79.1, 252/79.4; 438/745, 754; 134/1.2, 2
See application file for complete search history.

(56) References Cited

U.S. PATENT DOCUMENTS

| | | | |
|---|---|---|---|
| 3,903,244 A | 9/1975 | Winkley | ............... 423/272 |
| 4,239,643 A | 12/1980 | Kowalski | ............ 252/400.22 |
| 5,290,361 A | 3/1994 | Hayashida et al. | ............ 134/2 |
| 5,302,311 A | 4/1994 | Sugihara et al. | ............ 510/175 |
| 5,480,894 A | 1/1996 | Hider et al. | ................ 514/348 |

FOREIGN PATENT DOCUMENTS

| | | |
|---|---|---|
| EP | 1 006 112 A1 | 6/2000 |
| EP | 1 091 395 A1 | 4/2001 |

OTHER PUBLICATIONS

International Search Report in WO 02/051961 A3.
Kirk-Othmer Encyclopedia of Chemical Technology (4th Ed.), vol. 13, p. 965.
Kem, et al.; Cleaning Solutions Based on Hydrogen Peroxide for use in Silicon Semiconductor Technology; RCA Review, Jun. 1970; pp. 187-205.
Mertens, et al.; Wafer Cleaning: A Quantifiable Process Step; Proc. of the 8th International Symposium on Silicon Materials Science and Technology; PV 98-1 (1998).
Mertens, et al.; Proc of the 5th International Symp. on Cleaning Technology in Semiconductor Manufacturing: PV 97-35 (1997).
Kirk-Othmer Encyclopedia of Chemical Technology (4th Ed.), vol. 13, p. 965, no date avail.
Kern, et al.; Cleaning Solutions Based on Hydrogen Peroxide for use in Silicon Semiconductor Technology; RCA Review, Jun. 1970; pp. 187-205.
Mertens, et al.; Wafer Cleaning: A Quantifiable Process Step; Proc. of the 8th International Symposium on Silicon Materials Science and Technology; PV 98-1 (1998).
Mertens, et al.; Proc of the 5th International Symp. on Cleaning Technology in Semiconductor Manufacturing; PV 97-35 (1997).

DEHP     1-EMHP     2-EMHP     DMHP

PEHP     PMHP     ECMHP     ECEHP

Primary Examiner—Gregory Mills
Assistant Examiner—Lynette T. Umez-Eronini
(74) Attorney, Agent, or Firm—Knobbe Martens Olson & Bear LLP

(57) ABSTRACT

The present invention is related to a composition comprising an oxidizing compound and a complexing compound with the chemical formula wherein R1, R2, R3 and R4 are selected from the group consisting of H and any organic side chain. The oxidizing compound can be in the form of an aqueous solution. The complexing compound is for complexing metal ions. Metal ions can be present in the solution or in an external medium being contacted with the solution. The present invention can be used for cleaning a semiconductor substrate

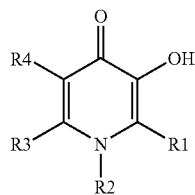

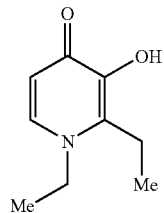

DEHP

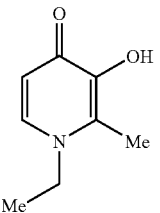

1-EMHP

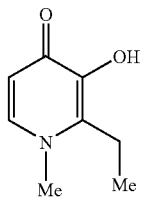

2-EMHP

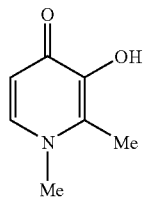

DMHP

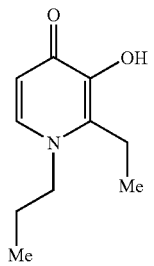

PEHP

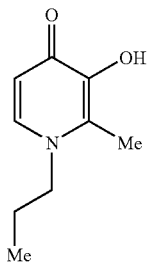

PMHP

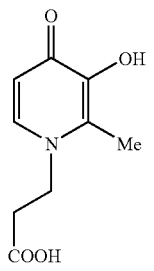

ECMHP

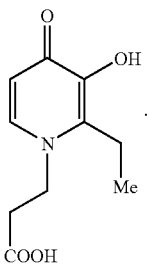

ECEHP

27 Claims, 2 Drawing Sheets

DEHP

1-EMHP

2-EMHP

DMHP

PEHP

PMHP

ECMHP

ECEHP

COMPOSITION COMPRISING AN OXIDIZING AND COMPLEXING COMPOUND

This application is the national phase under 35 U.S.C. §371 of prior PCT International Application No. PCT/BE01/00219 which has an International filing date of Dec. 21, 2001, which designated the United States of America, and which was published by the International Bureau in English on Jul. 4, 2002, and which claims the benefit of U.S. Provisional Application No. 60/257,928 filed Dec. 22, 2000.

FIELD OF THE INVENTION

This invention is situated in the field of products and methods for the stabilizing a composition comprising an oxidizing compound.

STATE OF THE ART

Chemical solutions comprising an oxidizing compound such as hydrogen peroxide are used in a wide area of applications, for example, as bleaching agent for paper pulp applications, dental bleaching composition or as cleaning agents.

Chemical solutions comprising an oxidizing compound have often problems related to the stability of the solution. In pure form, aqueous solution are stable over extended periods of time. However, the presence of certain metal ions in the solution causes decomposition of the oxidizing compound. Consequently, stabilizers to prevent such decomposition should be added. Stabilizers can be e.g. a complexing compound, such that the complexing compound will bind to the metal and consequently, the metal is not available for reaction with the oxidizing compound. Thus, the decomposition of the oxidizing compound is substantially inhibited and the lifetime of the solution is increased.

Very stringent specifications must be met by oxidizing solutions for specialized applications such as semiconductor applications or reagent chemicals.

An overview of stabilizing oxidizing compound, and more specifically hydrogen peroxide solutions, is given in Kirk-Othmer Encyclopedia of Chemical Technology (4$^{th}$ edition), vol. 13 p. 965.

U.S. Pat. No. 4,239,643 discloses an aqueous peroxide-containing solutions used in bleaching of cellulose fiber, wherein the stability of the peroxide is very greatly increased by inclusion of alkali metal polyphosphate and alkali metal diethylene triamine penta(methylene phosphonate).

U.S. Pat. No. 3,903,244 describes a hydrogen peroxide concentrate containing up to 50% hydrogen peroxide, 1 to 3% of a soluble amino(methyl phosphonic acid) or a salt thereof, and 0.05 to 0.5% of phenol. The concentrate is useful in the preparation of highly acid metal pickling baths.

Stabilizing compounds are useful for a wide area of application, such as soil remediation, metal etch bath, denture bleaching, bleaching of fats, oils, waxes,, wastewater treatment, paper pulp bleaching, textile bleaching, CMP applications or semiconductor applications. In cleaning application, for example in semiconductor application, oxidizing solutions have been investigated extensively.

Since the invention of the RCA cleaning by Kern et al. in 1965 (W. Kern and D. A. Pautinen, RCA Review 31, 187, 1970) this cleaning cycle has become the most used for semiconductors. The conventional RCA cleaning consists of two steps: an alkaline solution, the so called SC1 solution and an acidic solution, SC2. The SC1 solution is composed of 1 part ammonia ($NH_4OH$), 1 part hydrogen peroxide ($H_2O_2$) and 5 parts ultra pure water ($H_2O$) and is often referred to as APM-cleaning (i.e. Ammonia Peroxide Mixture). Originally it was used to remove organic residues by oxidation. Later it has been proven to be very efficient to remove particles.

A drawback of the SC1 solution is that metals precipitate on silicon surfaces; especially aluminum, iron and zinc have been shown to adsorb strongly on the wafer surface (Mertens et al., Proc. of the 8$^{th}$ Internat. Symp. *On Silicon Materials Science and Technology* PV98-1 (1998)). In addition, especially Fe and Cu are found to catalyze the decomposition reaction of the peroxide (Mertens et al., Proc. of the 5$^{th}$ Internat. Symp. on Cleaning Technology in Semiconductor Device Manufacturing PV97-35 (1997)) leading to a decrease in the bath lifetime. In order to remove the metallic surface contamination, the SC2 solution consisting of 1 part hydrochloric acid, 1 part hydrogen peroxide and 6 parts ultra-pure water is used. However, it is expensive to get hydrochloric acid of sufficient quality for the usage in SC2 solution. There is also a risk of re-contaminating the surface with particles. Problems also occur in spray tools due the corrosive behavior of hydrochloric acid.

With the progress in semiconductor manufacturing the requirements concerning particle and metal contamination as well as roughness of the silicon surfaces became more stringent. This led to a number of variations of the RCA clean.

The potential problems related to the SC2 and the consideration to reduce process time and equipment by leaving out this acidic step led to the development of single-stage cleaning procedures. This can be done by using chemicals with reduced amount of metallic impurities. For that purpose, advanced purification procedures are established for obtaining ultra-pure water, ammonia and hydrogen peroxide. However, these chemicals are very expensive and the purity is not always assured when they are used in a cleaning bath. Moreover, the cleaning solution is not very robust with respect to metal contamination from the semiconductor substrate and from the hardware.

Besides this, having an extra step in the cleaning cycle to remove residual metallic contamination implies extra hardware, e.g. a SC2-tank and a rinse tank need to be used, and more chemicals. Leaving out this extra step will results in a reduction of the hardware cost and a reduction of the amount of chemicals used in the cleaning cycle.

EP 528053 describes a method for treating a surface of a substrate with a surface treatment composition. The surface treatment composition comprises a liquid medium containing a complexing agent as a metal deposition preventive. The surface treatment composition is improved by incorporating at least two complexing agents. A first complexing agent is preferably an aromatic hydrocarbon ring with at least an OH or O$^-$ group bonded to a carbon atom constituting the ring. A second complexing agent is compound having a donor atom, such as heterocyclic amines. Since this cleaning composition comprises two complexing agents, drawbacks such as higher cost and increased waste treatment are observed. Moreover, aromatic hydrocarbons such as Tiron, Catechol derivatives are hazardous for the environment and for humans.

U.S. Pat. No. 5,290,361 and U.S. Pat. No. 5,302,311 describes an aqueous hydrogen peroxide solution further comprising a complexing compound containing phosphonic acid groups and showing complexing ability. Cleaning solution comprising phosphonic acid goups are not effective in removing or suppressing Al from the substrate. Moreover, enhanced deposition of Cu has been measured. This makes the cleaning solutions less suitable.

In the present invention, the problems related to removal of metals as mentioned in the prior art, are avoided.

AIMS OF THE INVENTION

It is an aim of the invention to provide a stable composition comprising an oxidizing compound and a complexing compound.

It is a further aim of the invention to provide a new composition for treating a surface which is stable and provokes less or no metal precipitation on the surface.

Another aim of the invention is to provide a new cleaning solution. Another aim of the present invention is to provide an efficient APM-cleaning solution having a good robustness with respect to metal contamination.

A further aim is to provide a new single-step method for cleaning semiconductor surfaces.

SUMMARY OF THE INVENTION

In a first aspect of this invention, a composition is disclosed comprising an oxidizing compound and a complexing compound with the chemical formula wherein R1, R2, R3 and R4 are selected from the group consisting of H and any organic side chain. The oxidizing compound can be in the form of an aqueous solution. The complexing compound is for complexing metal ions. Metal ions can be present in the solution or in an external medium being contacted with the solution. Depending on the metal ion being complexed, one or more complexing molecules/metal ion are required.

In an embodiment of this first aspect, said composition as recited in the first aspect of this invention can further comprise an alkaline compound.

In a further embodiment of this first aspect, said organic side chain can comprise an aliphatic side chain, a heterocyclic side chain or an aromatic side chain.

In a further embodiment of the first aspect of this invention, R3 and R4 can be hydrogen while R1 and R2 can be a functionalized aliphatic side chain. Preferably, said complexing compound is one of the group consisting of DEHP, 1-EMHP, 2-EMHP, DMHP, PEPH, PMHP, ECMHP and ECEHP.

In a further embodiment of this first aspect, a solution as recited in the first aspect of this invention is disclosed characterized in that said oxidizing compound is hydrogen peroxide. Hydrogen peroxide will be stabilized by the addition of the complexing compound, such that decomposition is substantially inhibited.

In a further embodiment of this first aspect of the invention, a composition as disclosed wherein said oxidizing compound is hydrogen peroxide.

In a further embodiment of this first aspect, a composition as recited in the first embodiment of the first aspect of the invention is disclosed wherein alkaline compound comprises an inorganic or organic basic compound. Said alkaline compound can be ammonia or an organic amine, preferably an organic amine chosen from the group consisting of tetraalkylammoniumhydroxide, alkanolamine, choline(hydroxyltrialkylammoniumhydroxide) and guanidine compounds.

In a second aspect of this invention, a method for treating a semiconductor substrate is disclosed. Said semicondcutor substrate is treated with a composition comprising an aqueous solution of a complexing compound with the chemical formula wherein R1, R2, R3 and R4 are selected from the group consisting of H and any organic side chain. Said composition can further comprise an oxidizing compound.

Said composition can be used for treating a substrate, such that particles are oxidized and metallic contamination is removed. The complexing molecule is for complexing metallic residues being present on the substrate and in the solution. Additionally, the lifetime of the solution is increased since de decomposition of the oxidizing compound is substantially inhibited. Said solution is particularly suitable for cleaning a semiconductor substrate. Said composition for cleaning a semiconductor substrate can be any composition described in the first aspect of this invention.

In an embodiment of this second aspect of this invention, said R1, R2, R3 and R4 are selected from the group consisting of H and any organic side chain. Said organic side chain can comprise an aliphatic side chain, a heterocyclic side chain or an aromatic side chain. In a further embodiment of this second aspect of the invention, R3 and R4 can be hydrogen while R1 and R1 can be a functionalized aliphatic side chain. In a further embodiment, said complexing compound is one of the group consisting of DEHP, 1-EMHP, 2-EMHP, DMHP, PEPH, PMHP, ECMHP and ECEHP.

In another embodiment of the second aspect of the present invention, said oxidizing compound can be hydrogen peroxide.

In an embodiment of the second aspect of this invention, said composition can further comprise an alkaline compound. Said alkaline compound can comprise an inorganic or organic basic compound. Said basic compound can be chosen from the group consisting of ammonia and organic amine, preferably an organic amine chosen from the group consisting of tetraalkylammoniumhydroxide, alkanolamine, choline(hydroxyltrialkylammoniumhydroxide) and guanidine compounds.

In an embodiment of the second aspect of this invention, the method as recited in second aspect of the invention is disclosed wherein the concentration of hydrogen peroxide in the solution lies between 0.001 to 30 weight %.

In an embodiment of the second aspect of this invention, the method as recited in second aspect of the invention is disclosed in which the amount of the complexing agent lies between 0.1 and 1000 ppm of said solution.

In an embodiment of the second aspect of this invention, the method as recited in second aspect of the invention is disclosed wherein the amount of the alkaline compound lies between 0.001 and 30 weight %.

DETAILED DESCRIPTION OF THE INVENTION

In relation to the appended drawings the present invention is described in detail in the sequel. It is apparent however that a person skilled in the art can imagine several other equivalent embodiments or other ways of executing the present invention.

In an aspect of this invention, said composition comprises an oxidizing compound and a complexing compound. Said oxidizing compound can be in the form of an aqueous solution.

Figure 1:
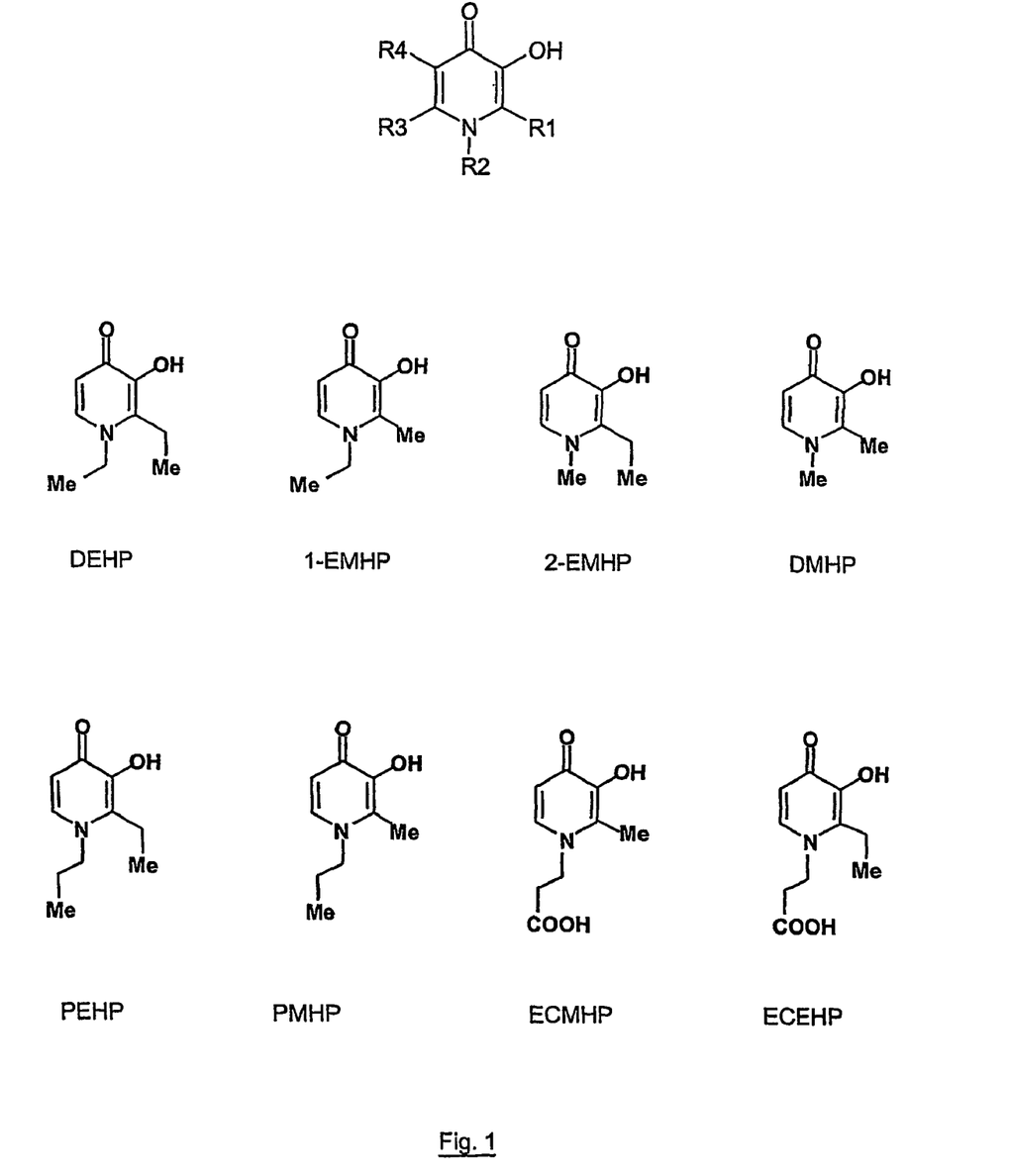
FIG. 1 chemical structure of complexing molecules

Said complexing agent can have a chemical formula as given in FIG. 1. $R_1$, $R_2$, $R_3$ and $R_4$ are independently selected from the group comprising hydrogen (H) or any organic group. $R_1$, $R_2$, $R_3$, or $R_4$ can have a different chemical structure. For the purpose of this invention, said complexing agent as mentioned above is generally referred to as pyridinone.

Said organic group can be every possible sequence of C, N, O or S atoms linked to each other by single, double or triple bonds such that the complexing properties of the final complexing agent are assured. Said organic group can be selected from the group comprising aliphatic side chains, heterocycles and aromatic structures.

Said organic side chain is every possible sequence of carbon, atoms linked to each other by a single, double or triple bound and optionally characterised by the presence of functional groups linked to the carbon atoms. Functional groups can be alcohol, carboxyl, carbonyl, aldehyde, keton, ether, ester, amine, amide, halogen containing groups.

Figure 2:
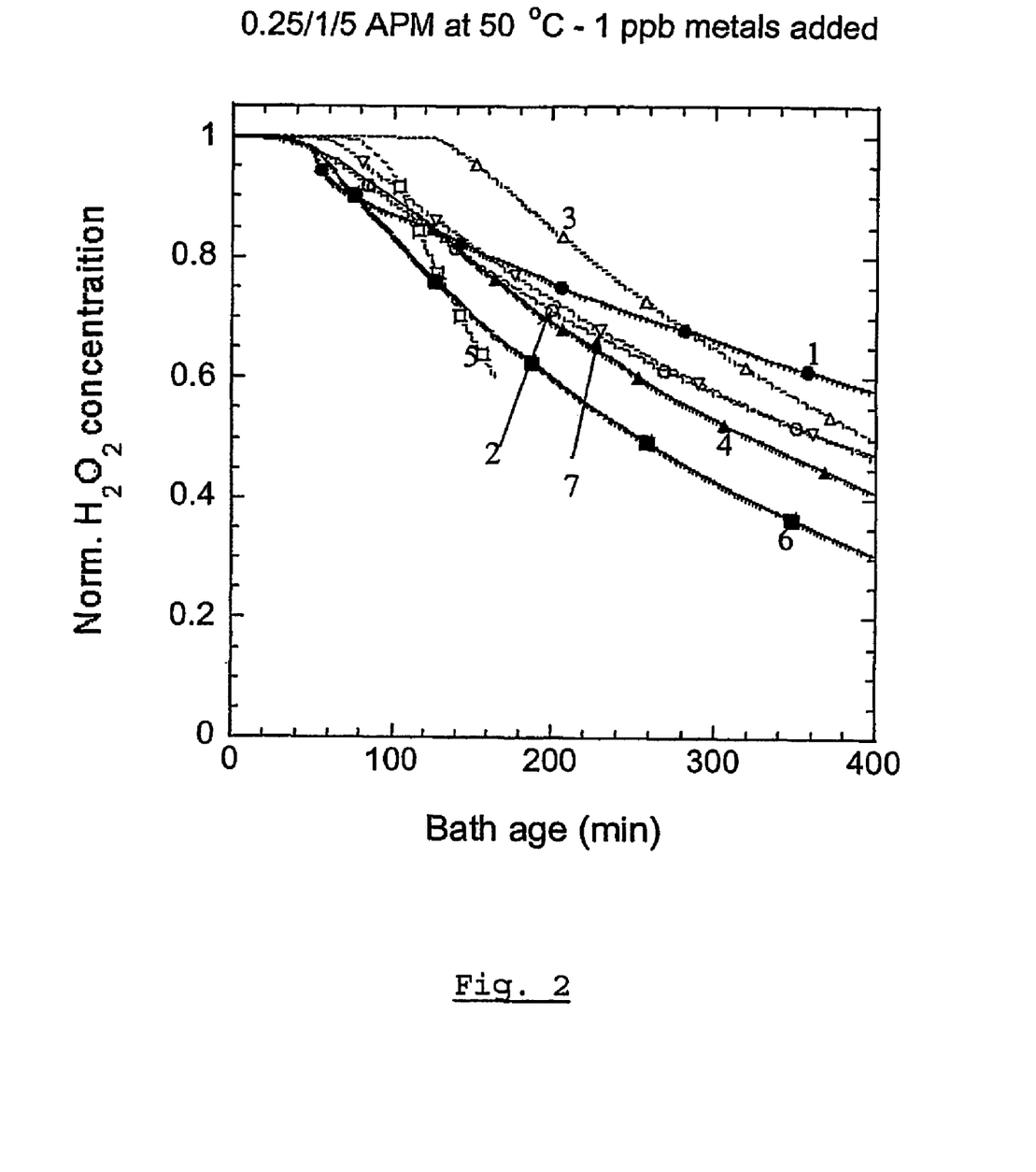
FIG. 2 bath age (minutes) as function of the normalized $H_2O_2$ concentration, 1=no complexing agent; 2=DEHP; 3=10×DEHP; 4=1=EMHP; 5=10×1-EMHP; 6-DMHP and 7=10×DMHP.

Said heterocycle can be one of the group comprising a crown ether, a cryptant, a calixarene, . . . In a preferred embodiment, $R_3$ and $R_4$ are H atoms, while $R_1$ and $R_2$ are a methyl, ethyl, (iso)propyl or butyl group. Said methyl, ethyl, (iso) propyl or butyl group can functionalized, e.g. with a carboxyl group (COOH or COO⁻). Preferably, the complexing molecules as described in FIG. 2 are used.

DEHP=1,2-Diethyl-3-hydroxy-4(1H)-pyridinone
1-EMHP=1-Ethyl-2-methyl-3-hydroxy-4(1H)-pyridinone
2-EMHP=1-Methyl-2-ethyl-3-hydroxy-4(1H)-pyridinone
DMHP=1,2-Dimethyl-3-hydroxy-4(1H)-pyridinone
PEPH=1-Propyl-2-ethyl-3-hydroxy-4(1H)-pyridinone
PMHP=1-Propyl-2-methyl-3-hydroxy-4(1H)-pyridinone
ECMHP=1- (2'Carboxyethyl)-methyl-3-hydroxy-4(1H)-pyridinone
ECEHP=1-(2'Carboxyethyl)-2-ethyl-3-hydroxy-4(1H)-pyridinone.

Although the addition of the amount of complexing agent in the composition in this invention is not particularly limited, it depends on the degree of metal contamination -and on the kind of other compounds being present in the solution. Furtheron, the amount of complexing agent depends on the specific chemical structure of the complexing compound. The amount of the complexing agent lies 0.01 and 10000 ppm, between 0.1 and 1000 ppm of said composition. For this application, ppm should be understood as parts per million in the composition.

The amount of complexing compound depends on the specific complexing compound.

Since said complexing agents do not form a 1:1 metal/complexing agent complex, higher concentrations of complexing agents are required, compared to other complexing agents such as EDTA. Typical values for the stoichiometry CA/metal for Fe, Al, Cu and Zn are given in the table:

Complex Stability Constants:

|  | $Fe^1$ DMHP | $Al^2$ DMHP | Cu DMHP | Zn DMHP | $Fe^2$ DEHP | $Al^2$ DEHP | Cu DEHP | $Zn^2$ DEHP |
|---|---|---|---|---|---|---|---|---|
| [ML]/[M] [L] | 15.10 | 12.20 | 10.62 | 7.19 | 15.2 | 13.42 | 10.74 | 7.70 |
| [ML$_2$]/[ML] [L] | 11.51 | 11.05 | 8.99 | 6.34 | 11.76 | 11.64 | 9.07 | 6.09 |
| [ML$_3$]/[ML$_2$] [L] | 9.27 | 9.37 |  |  | 9.78 | 8.48 |  | 5.12 |
| [ML$_x$]/[M] [L]$^x$ | 35.88 | 32.62 | 19.61 | 13.53 | 36.8 | 33.54 | 19.81 | 18.91 |

| ² |  | DMHP |  | 1-EMHP |  | DEHP |  |
|---|---|---|---|---|---|---|---|
| [ML$_x$]/[M] [L]$^x$ |  | 37.2/36.4 |  | 37.7 |  | 36.8 |  |
| PFe |  | 19.4 |  |  |  | 19.7 |  |

¹X = 3
²Values have been taken from different authors and determined by different techniques.

Said oxidizing compound can be every chemical compound having oxidizing properties. E.g. organic species, metallic compounds, inorganic particles, silicon, etc. can be oxidized.

The oxidizing compound is a compound selected from the group comprising hydrogen peroxide or oxidizing anions. The oxidizing anions can be e.g. nitric acid and its salts, nitrate, persulfate, periodate, perbromate, perchlorate, iodate, bromate and chlorate salts of ammonium. Preferably, the oxidizing compound is hydrogen peroxide.

The concentration of the oxidizing compound can be, but is not limited hereto, between 0.0001 and 99 weight %, between 0.001 and 90 weight % and preferebly between 0.001 to 30 weight %.

In this application, weight % should be understood as the percentage of weight of the specified compound in the composition.

Said composition can further comprise an alkaline compound. The alkaline compound or base can be every chemical compound with a pH higher than 7. The alkaline compound can be an organic or inorganic compound. The alkaline compound can be an organic base, ammonia, ammoniumhydroxide, or an alkaline solution containing metal ions such as potassium or sodium. Said organic base can be a quaternary ammonium hydroxide such as tetraalkyl ammonium hydroxide in which the alkyl groups can contain hydroxy- and alkoxy-containing groups with 1 to 4 carbon atoms in the alkyl or alkoxy group. Said organic base can further be an organic amine such as an alkanol amine. Alkanol amines can be 2-aminoethanol, 1-amino 2-propanol, 1-amino 3-propanol. Preferably, the alkaline compounds are tetramethyl ammonium hydroxide, and trimethyl 2-hydroxy ethyl ammonium hydroxide (choline) and ammonium hydroxide. The amount of the alkaline compound lies between 0.0001 and 90 weight %, between 0.001 and 50 weight %, between 0.001 and 30 weight %.

Said compositon can further comprise a surfactant.

In a second aspect of this invention, a method for treating a semiconductor substrate is disclosed. Said semiconductor substrate is treated with a composition comprising an aqueous solution of a complexing compound with the chemical formula wherein R1, R2, R3 and R4 are selected from the group consisting of H and any organic side chain. Said composition can further comprise an oxidizing compound.

Said composition can be, but is not limited hereto, the composition described in the first aspect of this invention. Said composition is particularly usefull for cleaning a substrate such that particles are oxidized and metallic contamination is removed. The complexing compound is for complexing metals being present on the substrate and in the solution. Additionally, the lifetime of the solution is increased since de decomposition of the oxidizing compound is substantially inhibited.

A substrate can be, but is not limited hereto, a substrate such as semiconducting material, glass, quartz, ceramics, metal, plastic, magnetic material, superconductor and the like.

Preferably, said substrate is a semiconductor substrate. Semiconductor substrate can be every possible substrate used in semiconductor processing. Said semiconductor substrate can be a substrate selected from the group, but not limited hereto, comprising a substrate made of silicon, germanium, gallium arsenide, indium phosphide, etc.

The semiconductor substrate be e.g. the substrates as mentioned above covered entirely op partially with a thin film of e.g. an oxide, a nitride, a metal, a polymeric insulating layer, an anti-reflecting coating, a barrier, a photoresist layer, etc.

The present invention is particularly relevant for cleaning or etching a semiconductor substrate of which the surface should be highly clean.

When the composition is used for treating a substrate, the weight concentration range of the alkaline compound in the-cleaning solution are typically but not limited to 0.001–100%, 0.1–20% and preferably 0.1–5% by weight.

For ammonium hydroxide, the weight concentration range of the alkaline compound in the cleaning solution are typically but not limited to 0.001–30%, 0.1–20% and preferably 0.1–5% by weight. For other alkaline compounds, the weight concentration range is equivalent, and function of the strength of the alkaline compound.

For peroxide, the weight concentration the hydrogenperoxide is typically but not limited to 0.001–100%, 0.1–20% and preferably 0.1–5% by weight.

In the preferred embodiment of this invention, a composition for treating a semiconductor surface comprises ammonium hydroxide, hydrogen peroxide, water (hereafter called APM mictures) and additionally a complexing agent. Said complexing agent is one of the group consisting of the molecules as described in FIG. 2.

APM-cleaning mixtures comprising a complexing agent according to the present invention are robust with respect to metal contamination coming from the fresh chemicals as well as with respect to metal contamination introduced in the course of its use for cleaning. The robustness of the basic APM process can be improved by the addition of complexing agents which keep the metals in solution and prevent the above mentioned catalysis of the peroxide decomposition.

The volume mixing ratio of $NH_4OH(29\%)/H_2O_2(30\%)/H_2O$ is typically, but not limited hereto, 0.25/1/5.

The cleaning solution is prepared with the amounts as described above and afterwards the semiconductor substrate is treated with the cleaning solution.

In the best mode known to the applicant, molecule DMHP is selected and added in the amounts described above. The complexing agent can be added as the pure compound to the cleaning solution. Alternatively, the complexing agent can be dissolved in either water, ammonia or peroxide or a dilution of the two latter chemicals and added as such to the cleaning solution.

It is a further aim of the invention to disclose a process for treating a semiconductor substrate comprising the steps of treating said semiconductor substrate with the cleaning solution as described above and drying said semiconductor substrate.

An optional step: rinsing said semiconductor substrate can be performed after said treating said semiconductor substrate with the cleaning solution as described above.

In the step of treating said semiconductor substrate with said cleaning solution, the semiconductor substrate can be immersed in a bath containing the cleaning solution. Alternatively, the cleaning solution can be dispensed or sprayed onto the semiconductor substrate for instance by using a spray processor. In all cases, the cleaning performance of the solution can be enhanced by using a megasonic transducer.

The temperature range for treating the semiconductor substrate with the cleaning solution is typically but not limited to 0–95 degrees Celcius, 10–80 degrees Celcius and preferably between 20–70 degrees Celcius.

In the step of drying the semiconductor substrate, several techniques known in the art can be used, e.g. spin-drying, Maragoni-drying, drying techniques using organic vapours.

The step of rinsing the semiconductor substrate comprises treating the semiconductor substrate with DI water or treating the semiconductor substrate with a diluted acidic solution or with DI water containing the complexing agent in an amount of 1 to 100000 ppm, 10 to 10000 ppm and by preference 100 to 1000 ppm.

It is a further aim of the invention to describe a process for treating a semiconductor substrate comprising the step of:

treating said semiconductor substrate with any cleaning solution and/or treating said semiconductor substrate with any rinsing solution Said any cleaning solution can be any cleaning solution, not being limited to the compositions described in this application. Said rinsing solution comprises said complexing agent and water. Said complexing agent can be any complexing agent described in this application. The amount of the complexing agent in the composition can be between 1 and 100000 ppm, 10 and 10000 ppm and by preference between 100 and 1000 ppm.

This rinsing solution can also comprise a surfactant in an amount of 0.1 ppm to 10 w %.

A surfactant is a surface-active agent comprising a lyophobic group and a lyophilic group. The lyophobic group can be a straight-chain alkyl group or a branched-chain alkyl group (C8–C20), an long-chain (C8–C20) alkyl benzene residue, an alkylnaphtalene residue (C3 and greater-length alkyl groups), high-molecular-weight propylene oxide polymers (polyoxypropylene glycol derivatives), long-chain perfluoroalkyl or polysiloxane groups.

Depending upon the lyophilic group, the surfactant can be an anionic, cationic, nonionic or zwitterionic surfactant. Anionic surfactants can be carboxylic acids or carboxylic acid salts (such as sodium and potassium salts of straight-chain fatty acids), sulfonic acids or sulfonic acid salts (such as linear alkylbenzenesulfonates, higher alkylbenzenesulfonates, benzene-, toluene-, xylene- and cumene-sulfonates, ligninsulfonates, petroleum sulfonates, N-acyl-n-alkyltaureates, paraffin sulfonates, secondary n-alkanesulfonates, α-olefin sulfonates, sulfosuccinate esters, alkylnaphtalenesulfonates or isethionates), sulfuric acid ester salts (such as sulfated linear primary alcohols, sulfated polyoxyethylenated straight-chain alcohols or sulfated triglyceride oils), phosphoric and polyphosphoric acid esters. Cationic surfactants can be primary amines and their salts, diamines and polyamines and their salts, quaternary ammonium salts (such as tetralkylammonium salts or imidazolinium salts), polyoxyethylenated long-chain amines ($RN(CH_2CH_2O)_xH]_2$), quaternized polyoxyethylenated long-chain amines or amine oxides (such as N-alkyldimethylamine oxides). Nonionic surfactants can be polyoxyethylenated alkylphenols, polyoxyethylenated straight-chain alcohols, polyoxyethylenated polyoxypropylene glycols, polyoxyethylenated mercaptans, long-chain carboxylic acid esters (such as glyceryl and polyglyceryl esters of natural fatty acids, propylene glycol, sorbitol or polyoxyethylenated sorbitol esters, polyoxyethylene glycol esters and polyoxyethylenated fatty acids), alkanolamides, tertiary acetylenic glycols, polyoxyethylenated silicones, N-alkylpyrrolidones or alkylpolyglycosides. Zwitterionic surfactants have both anionic and cationic charges present in the lyophilic portion (such as β-N-alkylaminopropionic acids, N-alkyl-β-iminodipropionic acids, imidazoline carboxylates, N-alkylbetaines, amine oxides, sulfobetaines or sultaines) (M. J. Rosen, Surfactants and Interfacial phenomena, $2^{nd}$ Edition, John Wiley and Sons, New York, 1989])

No additional alkaline compound should need to be added to the said rinsing solution. The pH range of said rinsing solution can typically be, but not limited to, between 5 and 8. Said Rinse solution can be dispensed or sprayed onto the semiconductor surface as described above. During rinsing the performance can also be enhanced by using a megasonic transducer.

The process of treating a semiconductor substrate with a cleaning solution comprising the above mentioned steps can be performed for a certain number of semiconductor substrates. After treating at least one substrate, but preferably after treating more substrates, the composition of the cleaning solution can be modified by e.g. adding extra alkaline compound, adding extra complexing compound, adding oxidizing compound such that the initial composition of the cleaning solution is kept constant as function of the process time.

COMPARATIVE EXAMPLES

The present invention will be further described using non-limiting examples and drawings.

The effectiveness of the new class of complexing agents on the inhibition of the metal catalyzed decomposition of peroxide and the prevention of metal outplating on silicon wafers in metal contaminated APM cleaning solutions is described next. For complexing agents as disclosed in this invention, different model compounds are selected (1-EMHP, 2-EMHP, DMHP, DEHP, PEHP, PMHP, ECMHP and ECEHP) and added to the bath at a concentration of $2.67 \times 10^{-5}$ M and at a 10×, 40×, or 50× higher concentration (namely $2.65 \times 10^{-4}$ $10.6 \times 10^{-4}$ and $13.25 \times 10^{-4}$ M). A comparison is made with other types of complexing agents containing as functional groups either phosphonic acids, such as diethylene (kleine letter) triamine penta-methylene-phosphonic acid (DTPMP), carboxylic acids, such as ethylene diamino tetra acetic acid (EDTA). An overview of the different chemicals used for the experiments is given in Table 1. All experiments were done in a class 1000 clean room environment or better.

TABLE 1

Chemicals used for preparation of APM baths.

| Chemical | Vendor | Grade |
| --- | --- | --- |
| $H_2O_2$ 30 (w/w) % | Ashland | TB(*) |
| $NH_4OH$ 29 (w/w) % | Ashland | TB(*) |
| EDTA | Fluka | |
| DTPMP | Monsanto | Dequest 2060S |
| DMHP | Aldrich | |

(*)TB-grade corresponds with a specification of maximal 100 ppt of metal ions in the chemical.

Example 1

Metal Outplating from APM Mixtures in Presence of Different Complexing Agents

The efficiency of complexing agents to suppress the deposition of metallic contamination onto wafer surfaces was studied. This was done through intentionally spiking well controlled trace amounts of metallic contamination to cleaning solutions. For these metal deposition tests, p-type monitor wafers with a diameter of 150 mm and <100> orientation were used. The wafers were pre-cleaned using IMEC Clean® in an automated Steag wet bench (i.e. SOM+ dHF+O$_3$-rinse rendering a perfectly clean hydrophilic surface).

The metal deposition experiments were performed in a static quartz tank with a quartz cover plate. This tank was not equipped with a megasonic transducer. APM mixtures were prepared containing 1 w-ppb of different metals of interest with/without the complexing agent added. The metals spiked to the APM bath were added from AAS-standard solutions (Merck). After a bath age of 5 minutes, three wafers were immersed for 10 minutes, rinsed for 10 minutes in an overflow rinse tank and dried with a commercially available Marangoni drier (STEAG). The resulting metal contamination was measured with straight TXRF or VPD-DSE-DC-TXRF (Vapor Phase Decomposition Droplet Surface Etching Droplet Collection Total X-Ray Fluorescence). Determination of Al water surface concentration was done using VPD-DC GF-AAS (Graphite Furnace Atomic Absorption Spectroscopy).

An overview of the resulting metal surface contamination after dipping a clean wafer in an APM spiked with metals and different complexing agents is given in Table 2.

TABLE 2

Measured metal surface concentrations after immersion in metal contaminated 0.25/1/5 APM solution at 20–50° C. with different complexing agents present.

| Complexing agent | Conc. CA (2.7 × 10$^{-5}$ M) | Conc. Mt (w-ppb) | Al (10$^{10}$ at/cm$^2$) | Fe (10$^{10}$ at/cm$^2$) |
|---|---|---|---|---|
| Pre-clean only | NA | NA | 2.34 | <DL |
| None | 0 | 0 | 39.3 ± 6 | 1.5 ± 0.4 |
| None | 0 | 1 | 360 ± 21 | 109 ± 14 |
| EDTA | 1 | 1 | NM | 25.1 ± 0.1 |
|  | 10 | 1 | 272 ± 16 | NM |
|  | 100 | 1 | 274 | 2.78 |
| EDTA + DTPMP | 1 + 2 | 1 | 257 ± 2 | <DL |
| 1-EMHP (1) | 1 | 1 | 356 ± 32 | 0.51 ± 0.02 |
|  | 10 | 1 | 142 ± 68 | 0.23 |
| 1-EMHP (2) | 1 | 1 | 292 ± 1 | 0.20 ± 0.00 |
|  | 10 | 1 | 27 ± 33 | NA |
|  | 50 | 1 | 0.5 ± 0.2 | 0.26 |
|  |  |  | 2.4 ± 1.4 | 0.16 |
| 2-EMHP | 1 | 1 | 404 | 0.35 ± 0.01 |
|  | 10 | 1 | 248 ± 69 | 0.22 |
|  | 50 | 1 | 0.8 ± 0.2 | 0.15 |
| DEHP | 1 | 1 | 369 ± 0 | 0.33 ± 0.01 |
|  | 10 | 1 | 150 ± 41 | 0.92 |
|  | 50 | 1 | 2.6 ± 0.6 | 0.15 |
| DMHP (Aldrich) | 1 | 1 | 392 ± 0 | 0.45 ± 0.01 |
|  | 10 | 1 | 101 ± 2 | 0.21 |
|  | 50 | 1 | 1.2 ± 0.1 | NM |
| DMHP | 1 | 1 | 387 ± 0 | 0.40 ± 0.02 |
|  | 10 | 1 | 230 ± 5 | 0.18 |
| PEHP | 40 | 1 | 4.6 ± 0.2 | 0.14 ± 0.0 |
| PMHP | 40 | 1 | 1.13 | 0.14 ± 0.14 |
| ECMHP | 40 | 1 | 15.0 ± 0.5 | 0.08 ± 0.04 |
| ECEHP | 40 | 1 | 14.2 ± 1.7 | 0.15 ± 0.05 |

These data show that the addition of EDTA results in a decrease of the final Fe contamination levels but has no effect on the reduction of Al contamination. The use of DTPMP in a 1 w-ppb metal spiked bath, is very efficient to reduce the final Fe surface concentration but has no effect on suppression of Al deposition.

The new class of pyridinone complexing agents are able to reduce the final Fe and Al surface concentration on the wafer. Higher concentrations of complexing agent are needed because the pyridones do not form a 1:1 metal/chelate complex. When using the pyridinones at a concentration of 13.25×10$^{-4}$ M in the bath, the resulting Fe and Al surface contamination levels are below the values measured on a wafer treated with a clean, i.e. no metals spiked, APM solution.

Example 2

Decomposition of Peroxide in APM Cleaning Mixtures in Presence of Trace Metal Contamination and Metal Complexing Agents The effect of the addition of a complexing agent to APM cleaning solutions on the kinetics of the decomposition reaction of H$_2$O$_2$ has been investigated. Well controlled amounts of metallic contamination were added to the cleaning mixture under study.

As hydrogen peroxide decomposes, an amount of oxygen gas is liberated following the overall reaction

2 H$_2$O$_2$ ⇌ O$_2$ + 2 H$_2$O

The decay of the total peroxide concentration in the APM mixture can be monitored by measuring the time-dependent increase of the pressure due to the O$_2$-evolution in a dedicated set-up as described by Schmidt.

Numerical integration over time yields the actual peroxide concentration in the bath. It is convenient to use peroxide concentrations normalized to its initial value [H$_2$O$_2$]$_i$ as $$[H_2O_2]_n = \frac{[H_2O_2]}{[H_2O_2]_i}$$

Since the decomposition reaction is mainly catalyzed by Fe and in a lesser content Cu (Mertens et al. Proc. of the 5$^{th}$ Internat. Symp. on Cleaning Technology in Semiconductor Device Manufacturing PV97-35 (1997), the decay of peroxide concentration in a metal contaminated bath and in presence of a CA, illustrates the ability of complexing primarily Fe in the APM bath.

The decomposition rate as function of bath age is determined in APM mixtures (0.25/1/5 29%NH$_4$OH/30% H$_2$O$_2$/H$_2$O) spiked with 1 w-ppb of the metals of interest with and without different complexing agents. The effect of different additives on the inhibition of the metal catalyzed decomposition reaction of peroxide in APM cleaning mixtures is shown in FIG. 2. This graph shows the normalized H$_2$O$_2$ concentration as function of bath age for an APM mixture at 50° C. spiked with different complexing agents and the metals of interest.

All complexing agents are found to suppress to some extent the decomposition reaction, at least when the mixture is fresh. For some CA, the suppression action vanishes over time. This may be attributed to the destruction of the complexing agent or more specifically of the metal-complex in the hot APM. The time over which they remain active in complexing metals is summarized in Table 3 and can be used to establish the effective lifetime.

In example 1 it was demonstrated that higher CA concentrations have to be used in the cleaning solution. FIG. 1 and Table 3 show that with increasing complexing agent concentration, the effective lifetime of the bath can be increased substantially. Increasing the complexing agent concentration even further would result in a more prolonged lifetime.

TABLE 3

Effective lifetime of complexing agents in 0.25/1/5
metal spiked APM-cleaning mixtures at 50° C.

| Complexing agent | Conc. CA<br>($2.7 \times 10^{-5}$ M) | Effective lifetime<br>(min) |
| --- | --- | --- |
| None | 0 | 40 |
| DEHP | 1 | 40 |
|  | 10 | 120 |
| 1-EMHP (1) | 1 | 40 |
|  | 10 | 50 |
| 1-EMHP (2) | 1 | 60 |
|  | 10 | 90 |
| 2-EMHP | 1 | 30 |
|  | 10 | 40 |
| DMHP FfU | 1 | 40 |
|  | 10 | 100 |
| DMHP Aldrich | 1 | 20 |
|  | 10 | 60 |

The invention claimed is:

1. A composition comprising an aqueous solution, said aqueous solution comprising an oxidizing compound and a complexing compound, said complexing compound comprising a chemical formula wherein R1, R2, R3, and R4 are each independently selected from the group consisting of H and an organic side chain.

2. The composition as recited in claim 1, further comprising an alkaline compound.

3. The composition as recited in claim 1, wherein said organic side chain is selected from the group consisting of an aliphatic side chain, a heterocyclic side chain, and an aromatic side chain.

4. The composition as recited in claim 1, wherein R3 and R4 each comprise hydrogen and R1 and R2 each comprise a functionalized aliphatic side chain.

5. The composition as recited in claim 1, wherein said complexing compound is selected from the group consisting of 1,2-diethyl-3-hydroxy-4(1H)-pyridinone, 1-ethyl-2-methyl-3-hydroxy-4(1H)-pyridinone, 1-methyl-2-ethyl-3-hydroxy-4(1H)-pyridinone, 1,2-dimethyl-3-hydroxy-4(1H)pyridinone, 1-propyl-2-ethyl-3-hydroxy-4(1H)-pyridinone, 1-propyl-2-methyl-3-hydroxy-4(1H)-pyridinone, 1-(2-carboxyethyl)-2-methyl-3-hydroxy-4(1H)-pyridinone, and 1-(2-carboxyethyl)-2-ethyl-3-hydroxy-4(1H)-pyridinone.

6. The composition as recited in claim 1, wherein said oxidizing compound comprises hydrogen peroxide.

7. The composition as recited in recited in claim 2, wherein said alkaline compound comprises an inorganic basic compound or an organic basic compound.

8. The composition as recited in claim 7, wherein said alkaline compound is selected from the group consisting of ammonia and organic amine compounds.

9. The composition as recited in claim 2, wherein an amount of oxidizing compound comprises from 0.001 to 30 weight %.

10. The composition as recited in claim 1, wherein an amount of the complexing agent comprises from 0.1 to 1000 ppm of said solution.

11. The composition as recited in claim 7, wherein an amount of the inorganic basic compound or the organic basic compound comprises from 0.001 to 30 weight %.

12. The composition as recited in claim 1, wherein an amount of said oxidizing compound comprises from 0.001 to 95 weight %.

13. A method of treating a semiconductor substrate, wherein said method comprises treating a semiconductor substrate with a composition comprising an aqueous solution, said aqueous solution comprising a complexing compound comprising the chemical formula wherein R1, R2, R3, and R4 are each independently selected from the group consisting of H and an organic side chain.

14. The method as recited in claim 13, wherein said composition further comprises an oxidizing compound.

15. The method as recited in claim 13, wherein said composition further comprises an alkaline compound.

16. The method as recited in claim 13, wherein said organic side chain is selected from the group consisting of an aliphatic side chain, a heterocyclic side chain, and an aromatic side chain.

17. The method as recited in claim 13, wherein R3 and R4 each comprise hydrogen and R1 and R2 each comprise a functionalized aliphatic side chain.

18. The method as recited in claim 13, wherein said complexing compound is selected from the group consisting of 1,2-diethyl-3-hydroxy-4(1H)-pyridinone, 1-ethyl-2-methyl-3-hydroxy-4(1H)-pyridinone, 1-methyl-2-ethyl-3-hydroxy-4(1H)-pyridinone, 1,2-dimethyl-3-hydroxy-4(1H)pyridinone, 1-propyl-2-ethyl-3-hydroxy-4(1H)-pyridinone, 1-propyl-2-methyl-3-hydroxy-4(1H)-pyridinone, 1-(2-carboxyethyl)-2-methyl-3-hydroxy-4(1H)-pyridinone, and 1-(2-carboxyethyl)-2-ethyl-3-hydroxy-4(1H)-pyridinone.

19. The method as recited in claim 14, wherein said oxidizing compound comprises hydrogen peroxide.

20. The method as recited in claim 15, wherein the alkaline compound comprises an inorganic basic compound or an organic basic compound.

21. The method as recited in claim 20, wherein said inorganic basic compound or said organic basic compound is selected from the group consisting of ammonia and organic amine compounds.

22. The method as recited in claim 14, wherein an amount of the oxidizing compound comprises from 0.001 to 30 weight %.

23. The method as recited in claim 15, wherein an amount of the alkaline compound comprises from 0.001 to 30 weight %.

24. The method as recited in claim 13, wherein an amount of said complexing compound comprises from 0.1 ppm to 1000 ppm.

25. The composition as recited in claim 8, wherein said organic amine is selected from the group consisting of tetraalkylammoniumhydroxide compounds, alkanolamine compounds, choline(hydroxyltrialkylammoniumhydroxide) compounds, and guanidine compounds.

26. The method as recited in claim 21, wherein said organic amine is selected from the group consisting of tetraalkylammoniumhydroxide compounds, alkanolamine compounds, choline(hydroxyltrialkylammoniumhydroxide) compounds, and guanidine compounds.

27. A method of etching a metal, wherein said method comprises etching the metal in a metal etch bath comprising an aqueous solution, said aqueous solution comprising a complexing compound comprising the chemical formula wherein R1, R2, R3, and R4 are each independently selected from the group consisting of H and an organic side chain.

* * * * *